(12) United States Patent
Asterjadhi et al.

(10) Patent No.: US 9,525,520 B2
(45) Date of Patent: Dec. 20, 2016

(54) BLOCK ACKNOWLEDGEMENT SELECTION RULES

(71) Applicant: QUALCOMM Incorporated, San Diego, CA (US)

(72) Inventors: Alfred Asterjadhi, Chicago, IL (US); Maarten Menzo Wentink, Naarden (NL); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 13/842,888

(22) Filed: Mar. 15, 2013

(65) Prior Publication Data

US 2014/0177614 A1 Jun. 26, 2014

Related U.S. Application Data

(60) Provisional application No. 61/740,892, filed on Dec. 21, 2012, provisional application No. 61/745,188, filed on Dec. 21, 2012, provisional application No. 61/759,248, filed on Jan. 31, 2013, provisional application No. 61/766,572, filed on Feb. 19, 2013.

(51) Int. Cl.
*H04W 4/00* (2009.01)
*H04L 1/16* (2006.01)
*H04W 28/04* (2009.01)

(52) U.S. Cl.
CPC ........... *H04L 1/1685* (2013.01); *H04L 1/1614* (2013.01); *H04W 28/04* (2013.01)

(58) Field of Classification Search
USPC ............... 370/474, 349, 473, 236, 328, 329, 370/338, 370/389, 252, 455, 465
See application file for complete search history.

(56) References Cited

U.S. PATENT DOCUMENTS

| | | | | |
|---|---|---|---|---|
| 7,881,271 | B2 * | 2/2011 | Oishi | 370/338 |
| 2005/0285719 | A1 * | 12/2005 | Stephens | H04W 74/06 340/10.2 |
| 2006/0034317 | A1 * | 2/2006 | Hong et al. | 370/445 |
| 2006/0048034 | A1 * | 3/2006 | Cho | H04L 1/1614 714/749 |
| 2006/0248429 | A1 * | 11/2006 | Grandhi | H04L 1/1664 714/749 |
| 2009/0319852 | A1 * | 12/2009 | Nabetani | H04L 1/188 714/749 |
| 2012/0314696 | A1 * | 12/2012 | Liu | H04W 28/065 370/338 |

(Continued)

*Primary Examiner* — Phuongchau Ba Nguyen
(74) *Attorney, Agent, or Firm* — Dang M. Vo

(57) ABSTRACT

Certain aspects of the present disclosure provide methods and apparatus for selecting a type of block acknowledgement. An apparatus for wireless communications is provided herein. The apparatus generally includes a processing system configured to participate in a session with another apparatus during which the apparatus receives a plurality of MAC protocol data units (MPDUs) transmitted from the other apparatus during a window and select between a null data packet (NDP) BlockAck or a block acknowledgement (BA) frame for acknowledging which of the MPDUs have been successfully received by the apparatus. The apparatus generally also includes a transmitter configured to acknowledge which of the MPDUs have been successfully received by the apparatus in accordance with the selection.

150 Claims, 7 Drawing Sheets

(56) References Cited

U.S. PATENT DOCUMENTS

| | | | | |
|---|---|---|---|---|
| 2013/0094437 A1* | 4/2013 | Bhattacharya | ........ | H04L 1/1614 370/328 |
| 2013/0176939 A1* | 7/2013 | Trainin et al. | ................ | 370/328 |
| 2013/0227371 A1* | 8/2013 | Asterjadhi | ............ | H04L 1/1614 714/748 |
| 2013/0301569 A1* | 11/2013 | Wang | ................... | H04L 5/0055 370/329 |
| 2014/0092746 A1* | 4/2014 | Kwon | ................... | H04W 28/12 370/236 |

\* cited by examiner

ADDBA Request frame Action field format

| Order | Information |
|---|---|
| 1 | Category |
| 2 | Block Ack Action |
| 3 | Dialog Token |
| 4 | Block Ack Parameter Set |
| 5 | Block Ack Timeout Value |
| 6 | Block Ack Starting Sequence Control |
| 7(11aa) | GCR Group Address element (optional) |

FIG. 7

ADDBA Response frame Action field format

| Order | Information |
|---|---|
| 1 | Category |
| 2 | Block Ack Action |
| 3 | Dialog Token |
| 4 | Status Code |
| 5 | Block Ack Parameter Set |
| 6 | Block Ack Timeout Value |
| 7(11aa) | GCR Group Address element (optional) |

FIG. 8

BLOCK ACKNOWLEDGEMENT SELECTION RULES

CLAIM OF PRIORITY UNDER 35 U.S.C. §119

This application claims benefit of U.S. Provisional Patent Application Ser. Nos. 61/740,892, filed Dec. 21, 2012, 61/745,188, also filed Dec. 21, 2012, 61/759,248, filed Jan. 31, 2013, and 61/766,572, filed Feb. 19, 2013, all of which are herein incorporated by reference in their entirety.

FIELD OF THE INVENTION

Certain aspects of the present disclosure generally relate to wireless communications and, more particularly, to rules for determining how to acknowledge a block of MAC protocol data units.

RELEVANT BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a processing system configured to participate in a session with another apparatus during which the apparatus receives a plurality of MAC protocol data units (MPDUs) transmitted from the other apparatus during a window and select between a null data packet (NDP) BlockAck or a block acknowledgement (BA) frame for acknowledging which of the MPDUs have been successfully received by the apparatus and a transmitter configured to acknowledge which of the MPDUs have been successfully received by the apparatus in accordance with the selection.

Certain aspects of the present disclosure provide an apparatus for wireless communications. The apparatus typically includes a processing system configured to participate in a session with another apparatus during which the apparatus transmits a plurality of MAC protocol data units (MPDUs) to the other apparatus during a window and select between a null data packet (NDP) BlockAck or a block acknowledgement (BA) frame for the other apparatus to use for acknowledging which of the MPDUs have been successfully received by the other apparatus and a receiver configured to receive a transmission from the other apparatus, in accordance with the selection, acknowledging which of the MPDUs have been successfully received by the other apparatus.

Certain aspects of the present disclosure provide an apparatus for wireless communications. The apparatus typically includes means for participating in a session with another apparatus during which the apparatus receives a plurality of MAC protocol data units (MPDUs) transmitted from the other apparatus during a window, means for selecting between a null data packet (NDP) BlockAck or a block acknowledgement (BA) frame for acknowledging which of the MPDUs have been successfully received by the apparatus, and means for acknowledging which of the MPDUs have been successfully received by the apparatus in accordance with the selection.

Certain aspects of the present disclosure provide an apparatus for wireless communications. The apparatus typically includes means for participating in a session with another apparatus during which the apparatus transmits a plurality of MAC protocol data units (MPDUs) to the other apparatus during a window, means for selecting between a null data packet (NDP) BlockAck or a block acknowledgement (BA) frame for the other apparatus to use for acknowledging which of the MPDUs have been successfully received by the other apparatus, and means for receiving a transmission from the other apparatus, in accordance with the selection, acknowledging which of the MPDUs have been successfully received by the other apparatus.

Certain aspects of the present disclosure provide a method for wireless communications by an apparatus. The method typically includes participating in a session with another apparatus during which the apparatus receives a plurality of MAC protocol data units (MPDUs) transmitted from the other apparatus during a window, selecting between a null data packet (NDP) BlockAck or a block acknowledgement (BA) frame for acknowledging which of the MPDUs have been successfully received by the apparatus, and acknowledging which of the MPDUs have been successfully received by the apparatus in accordance with the selection.

Certain aspects of the present disclosure provide a method for wireless communications by an apparatus. The method typically includes participating in a session with another apparatus during which the apparatus transmits a plurality of MAC protocol data units (MPDUs) to the other apparatus during a window, selecting between a null data packet (NDP) BlockAck or a block acknowledgement (BA) frame for the other apparatus to use for acknowledging which of the MPDUs have been successfully received by the other apparatus, and receiving a transmission from the other apparatus, in accordance with the selection, acknowledging which of the MPDUs have been successfully received by the other apparatus.

Certain aspects of the present disclosure provide a computer program product for wireless communications by an apparatus comprising a computer-readable medium having instructions stored thereon. The instructions are generally executable by one or more processors for participating in a session with another apparatus during which the apparatus receives a plurality of MAC protocol data units (MPDUs) transmitted from the other apparatus during a window, selecting between a null data packet (NDP) BlockAck or a block acknowledgement (BA) frame for acknowledging which of the MPDUs have been successfully received by the apparatus, and acknowledging which of the MPDUs have been successfully received by the apparatus in accordance with the selection.

Certain aspects of the present disclosure provide a computer program product for wireless communications by an apparatus comprising a computer-readable medium having instructions stored thereon. The instructions are generally executable by one or more processors for participating in a session with another apparatus during which the apparatus transmits a plurality of MAC protocol data units (MPDUs) to the other apparatus during a window, selecting between a null data packet (NDP) BlockAck or a block acknowledgement (BA) frame for the other apparatus to use for acknowledging which of the MPDUs have been successfully received by the other apparatus, and receiving a transmission from the other apparatus, in accordance with the selection, acknowledging which of the MPDUs have been successfully received by the other apparatus.

Certain aspects of the present disclosure provide a station for wireless communications. The station typically includes at least one antenna, a processing system generally configured to participate in a session with another station during which the station receives a plurality of MAC protocol data units (MPDUs) transmitted from the other station during a window, select between a null data packet (NDP) BlockAck or a block acknowledgement (BA) frame for acknowledging which of the MPDUs have been successfully received by the station, and a transmitter configured to acknowledge, via the at least one antenna, which of the MPDUs have been successfully received by the station in accordance with the selection.

Certain aspects of the present disclosure provide an apparatus for wireless communications. The apparatus typically includes at least one antenna, a processing system configured to participate in a session with another station during which the station transmits a plurality of MAC protocol data units (MPDUs) to the other station during a window, select between a null data packet (NDP) BlockAck or a block acknowledgement (BA) frame for the other station to use for acknowledging which of the MPDUs have been successfully received by the other station, and a receiver configured to receive, via the at least one antenna, a transmission from the other station, in accordance with the selection, acknowledging which of the MPDUs have been successfully received by the other station.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example request frame Action field format, in accordance with certain aspects of the present disclosure.

FIG. 8 illustrates an example response frame Action field format.

DETAILED DESCRIPTION

Figure 1:
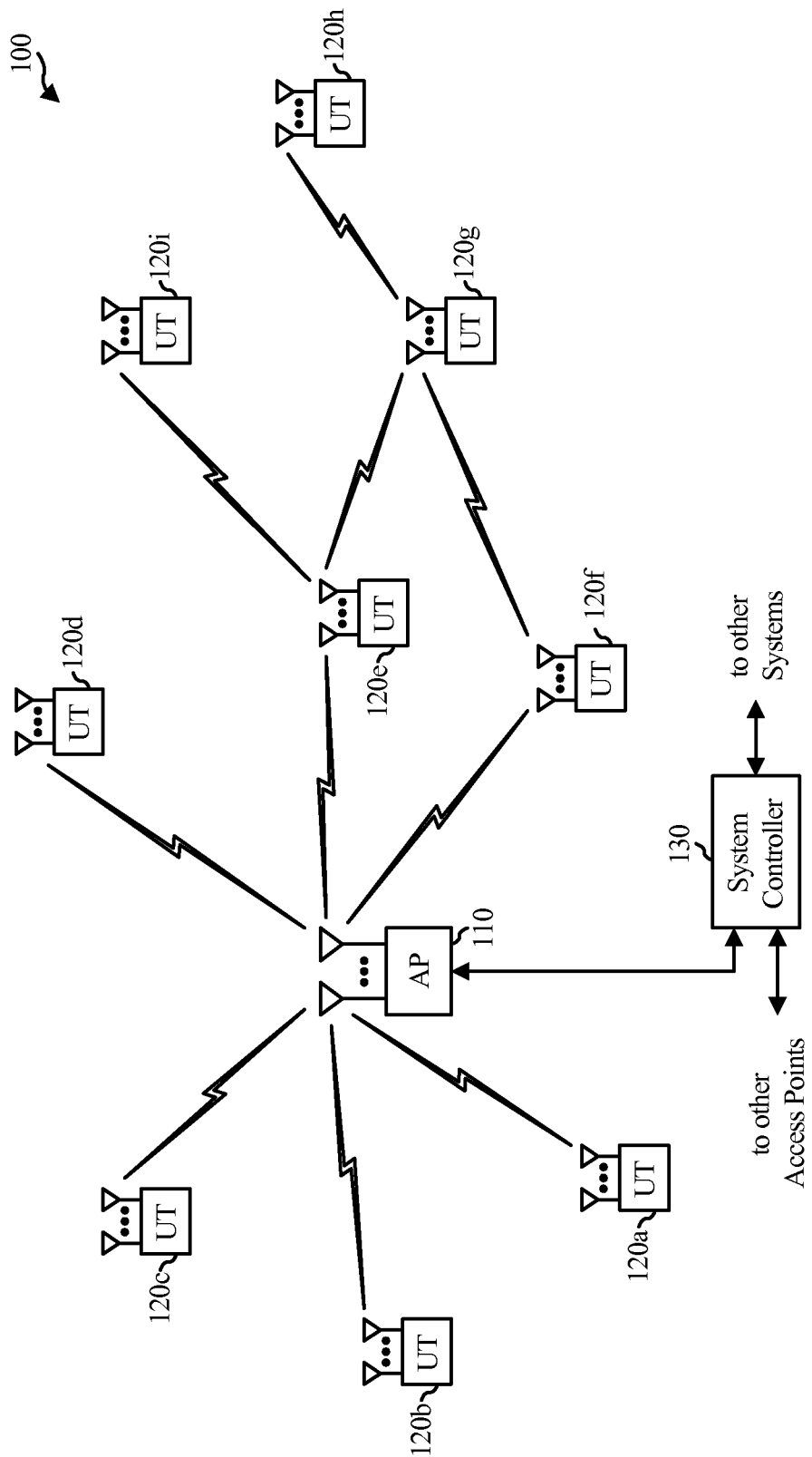
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
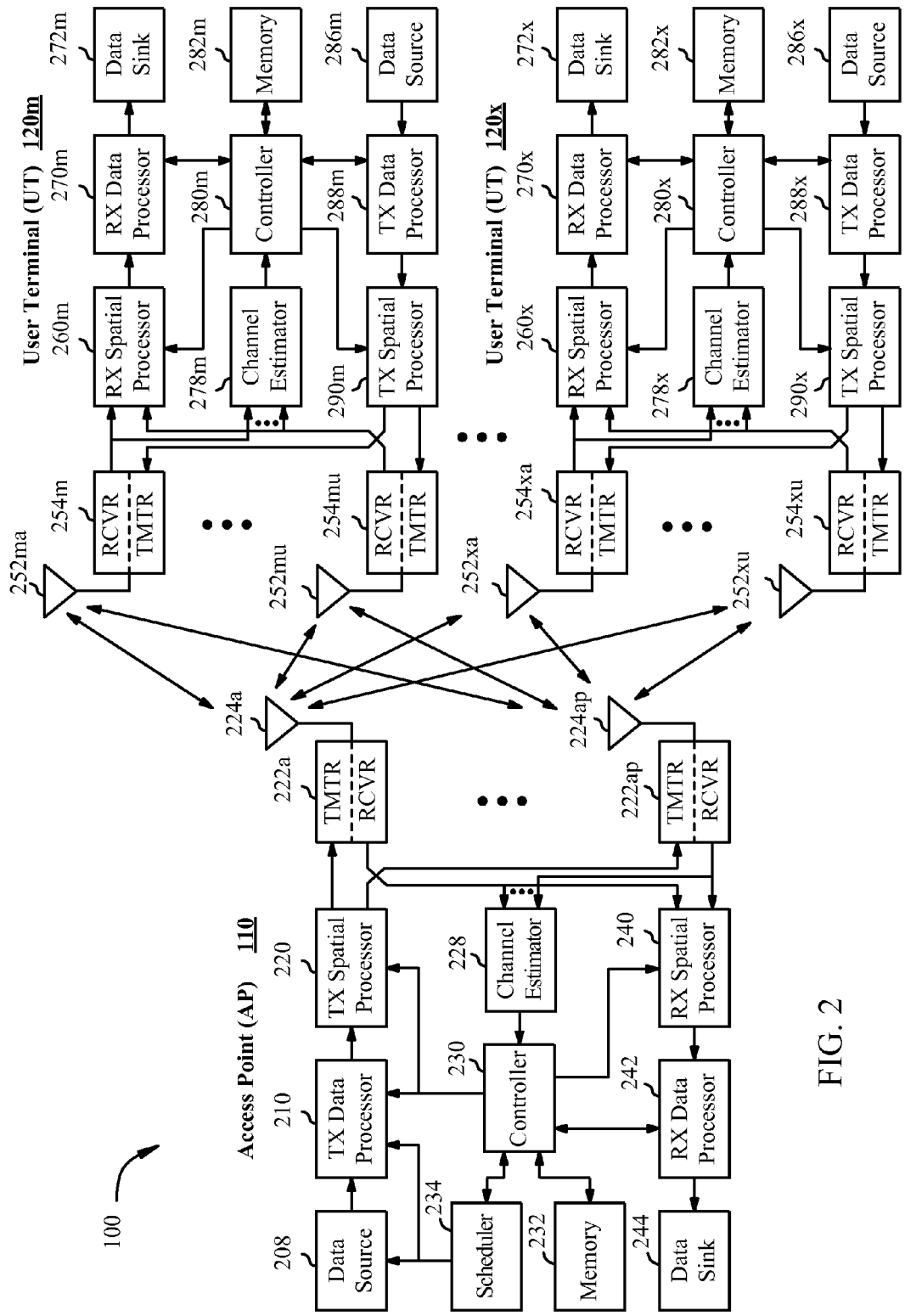
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
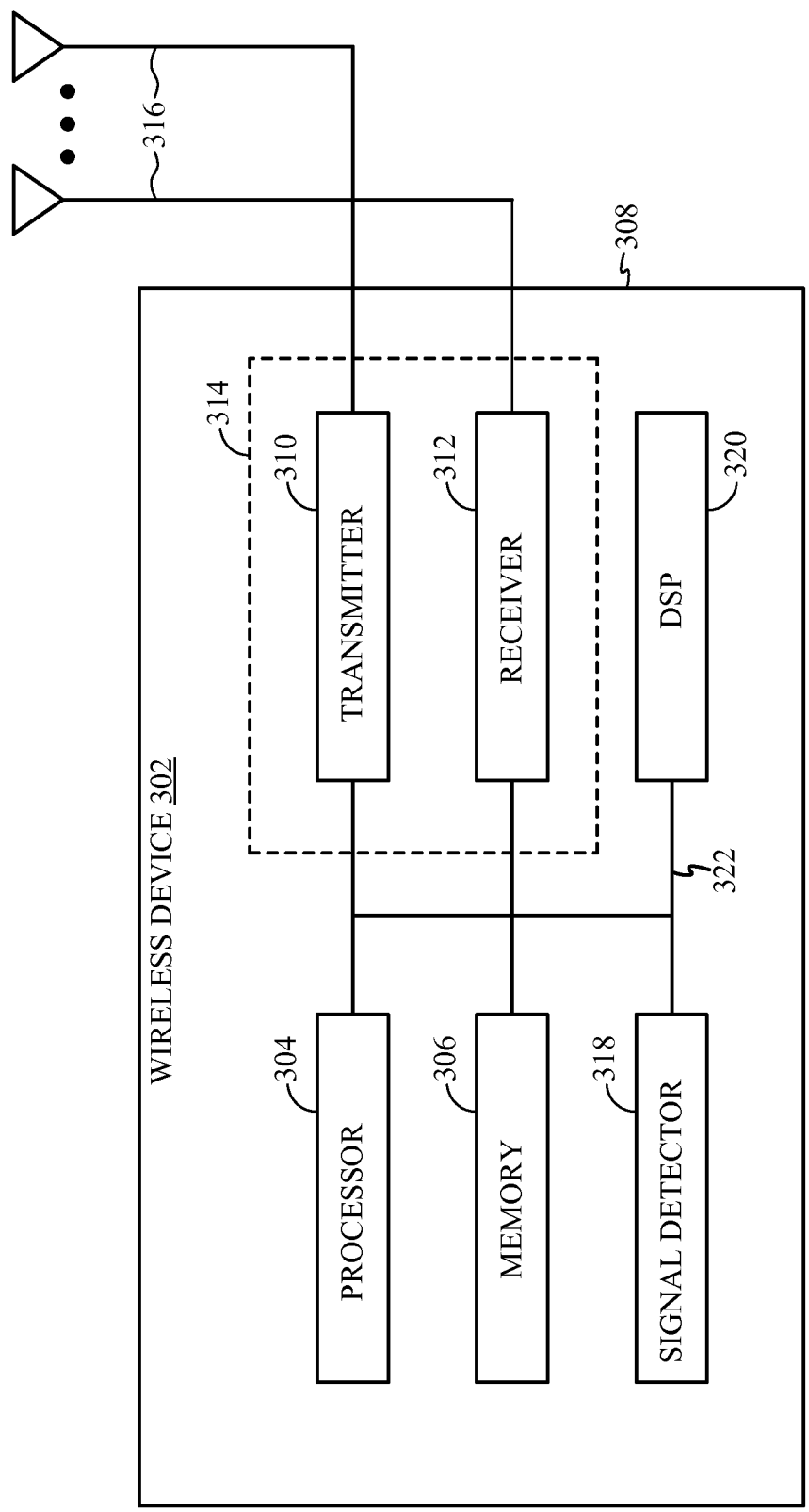
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Block ACK Selection Rules

Aspects of the present disclosure provide techniques for an transmitting entity (transmitter, commonly referred to as an originator) and receiving entity (receiver, commonly referred to as a recipient) to agree on what type of frames to use for block acknowledgement. Aspects of the present disclosure, in effect, define selection rules to solve this issue and allow the receiver and transmitter to agree on using/expecting a common BlockAck (BA) frame type. For example, the rules may determine how to select between a conventional BA frame or a null data packet (NDP) Block Ack.

Figure 4:
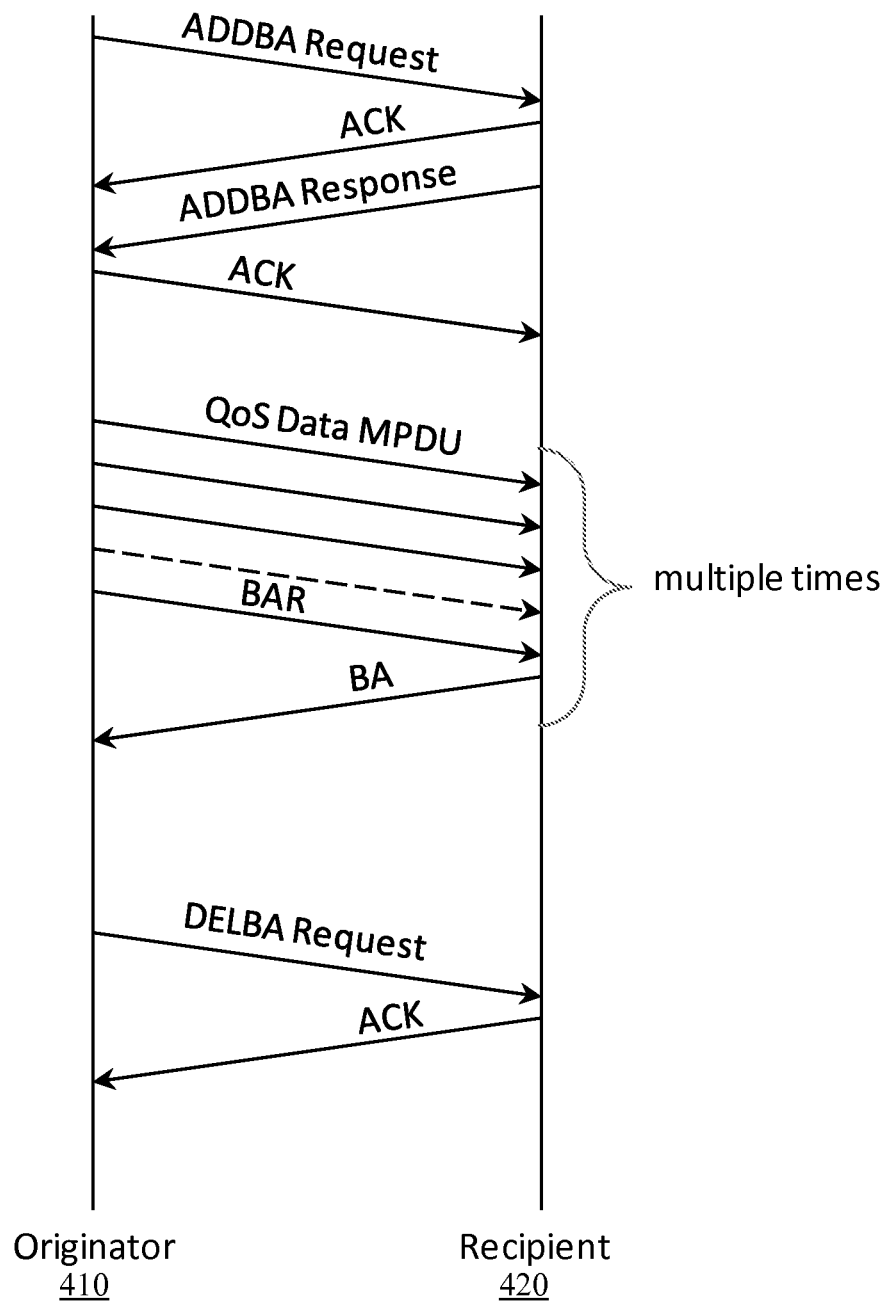
FIG. 4 illustrates an example exchange between an originator and recipient, in accordance with certain aspects of the present disclosure.

FIG. 4 illustrates an example Block Ack session in which aspects of the present disclosure may be practiced.

As illustrated, a session may begin with an Originator 410 sending a session request frame (ADDBA Request) to a Recipient 420. As will be described in greater detail below, according to certain aspects, the request frame may include an indication of an intention (of the originator) to use a BA frame or an NDP Block Ack.

The Recipient 420 sends a response to the session request frame (ADDBA Response). According to certain aspects, the response may include an indication of an intention (of the Recipient 420) to use a BA frame or an NDP Block Ack.

In some cases, there may be an Immediate Block Ack mechanism. The Originator 410 may send a Block Ack Request (BAR). The BAR may include a Starting Sequence Number (SSN-indicating the SN of the first packet for which the BAR is sent). In this case, the Recipient 420 may respond with a Block ACK. The response may include the SSN copied from BAR SSN field and may also include a reception status bitmap.

For a high throughput (HT)-immediate Block Ack, the Originator 410 may send an aggregated MPDU (A-MPDU), illustrated in FIG. 4, with the Originator 410 sending multiple MPDUs to the recipient. The Recipient 420 may respond with a BA. In general, the rules described in this application apply to other Block Ack mechanisms, such as, for example, a Delayed Block Ack or HT-Delayed Block Ack.

As described above, a conventional BA frame or an NDP Block Ack may be used for block acknowledgement. An NDP may include a bitmap in a SIG field of a physical layer (PHY) header with no need for MAC layer information. As a result, the NDP BlockACK may be highly efficient, particularly if the bitmap is sufficient to acknowledge all MPDUs transmitted within a reception window. NDP Block-ACK may also be preferred if the recipient has limited processing capability (e.g., with a limited buffer). In other cases, however, a BA frame may be preferred.

As multiple types are available for Block Acknowledgement, the Originator 410 and Recipient 420 of a Block Ack Session need to agree on the type frames to be used (or at least be able to determine what type is used even if no actual agreement). In some cases, there may be no agreement, but the type may be determined based on one or more rules or conditions. For example, (absent an agreement) Recipient 420 may always transmit an NDP Block Ack if a bitmap sufficient to cover reception status window-as described above.

Aspects of the present disclosure provide techniques that may be used to ensure an originator and recipient agree on the type of frames to be used for Block Acknowledgement during a session.

Figure 5:
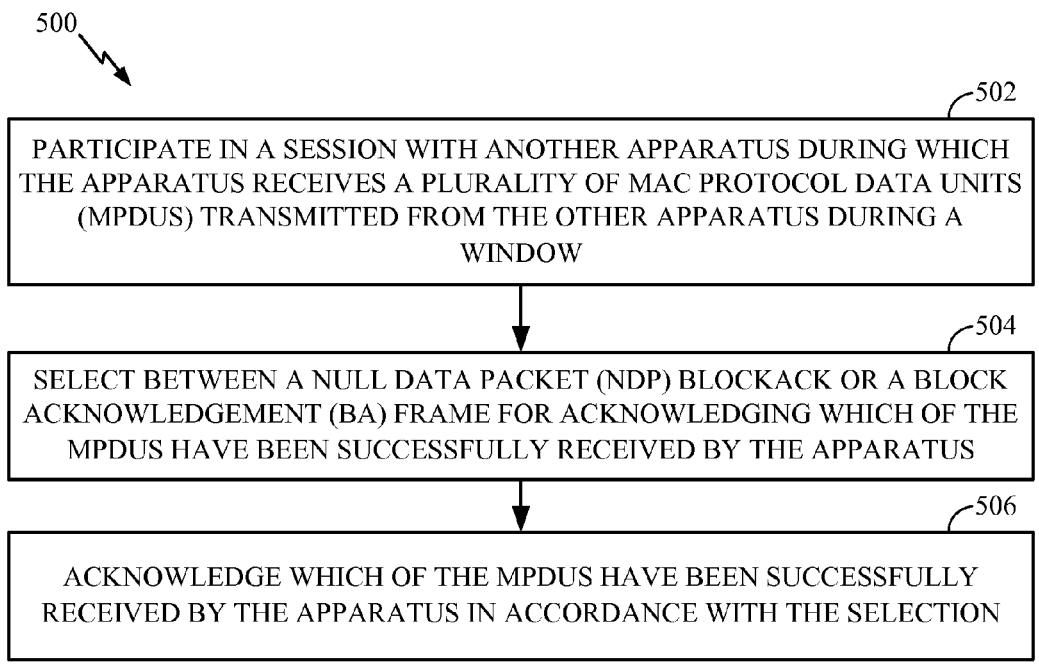
FIG. 5 illustrates a block diagram of example operations for wireless communications by a recipient, in accordance with certain aspects of the present disclosure.

FIG. 5 is a block diagram of example operations 500 for wireless communications by a receiving apparatus, in accordance with aspects of the present disclosure. The operations 500 may be performed by an apparatus, such as Recipient 420 shown in FIG. 4.

At 502, the apparatus participates in a session with another apparatus during which the apparatus receives a plurality of MAC protocol data units (MPDUs) transmitted from the other apparatus during a window.

At 504, the apparatus selects between a null data packet (NDP) BlockAck or a block acknowledgement (BA) frame for acknowledging which of the MPDUs have been successfully received by the apparatus. At 506, the apparatus acknowledges which of the MPDUs have been successfully received by the apparatus in accordance with the selection.

Figure 6:
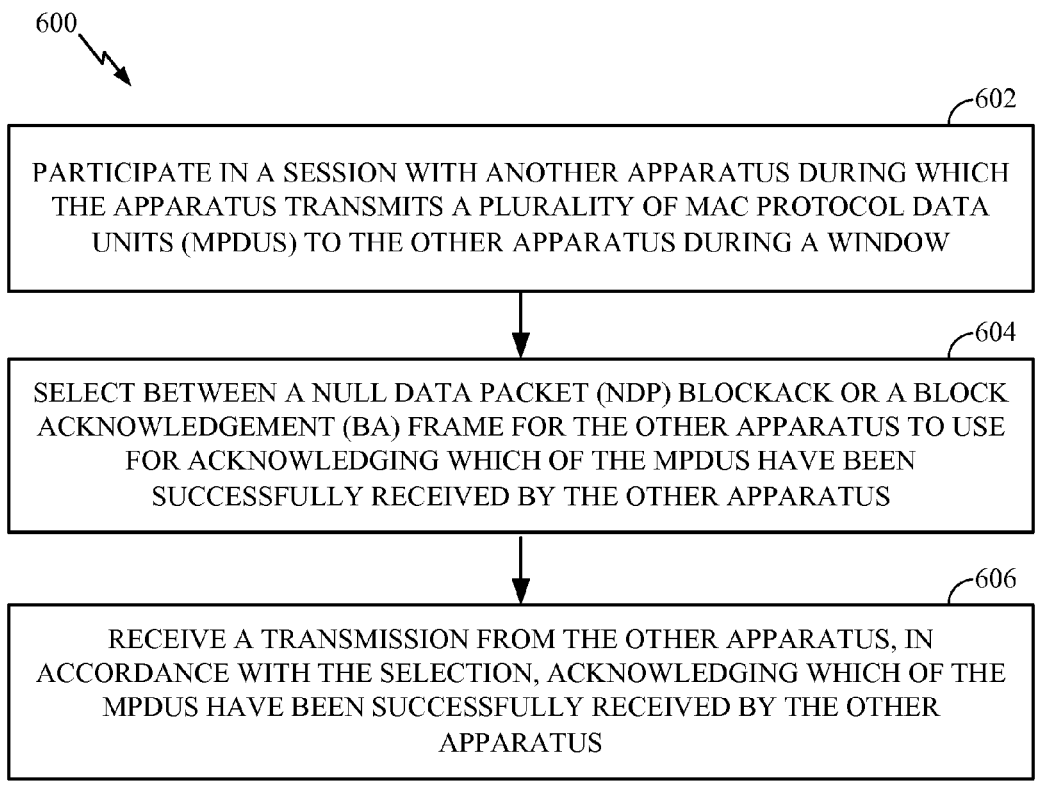
FIG. 6 illustrates a block diagram of example operations for wireless communications by an originator, in accordance with certain aspects of the present disclosure.

FIG. 6 is a block diagram of example operations 600 for wireless communications by a transmitting apparatus, in accordance with aspects of the present disclosure. The operations 600 may be performed by an apparatus, such as Originator 410 shown in FIG. 4. The operations 600 may be considered complementary to those of operations 500.

At 602, the apparatus participates in a session with another apparatus during which the apparatus transmits a plurality of MAC protocol data units (MPDUs) to the other apparatus during a window.

At 604, the apparatus selects between a null data packet (NDP) BlockAck or a block acknowledgement (BA) frame for the other apparatus to use for acknowledging which of the MPDUs have been successfully received by the other apparatus. At 606, the apparatus receives a transmission from the other apparatus, in accordance with the selection, acknowledging which of the MPDUs have been successfully received by the other apparatus.

According to certain aspects, there may be an implicit agreement between the originator and recipient. For example, the originator may indicate an expected (intended or requested) BA frame type in the BAR or A-MPDU. The indication, for example, may be provided via the use of (previously) reserved fields in the BAR or A-MPDU header (such as a retry bit or a more fragment field). In some cases, an originator may indicate an intended BA type in a capability Information Element (IE).

According to certain aspects, there may be an explicit agreement between the originator and recipient. For example, during BlockAck Session Setup, the Originator/Recipient may indicate an NDP preference in ADDBA Request. The preference may be mandatory (indicating a device insists on that type) or advisory (indicating that type is requested). For example, an indication from an originator may be considered advisory (meaning a recipient may use a different type), while indications from a recipient may be considered mandatory. As an alternative, indications from the originator may be considered mandatory.

According to certain aspects, an originator may provide an indication of an intended BA type may be provided in a session request. For example, a session request may include an indication of intention to use Normal BA or NDP BA frames via one or more values in a Block Ack Action field.

FIG. 7 illustrates an example of an ADDBA Request Action field format that may be used to provide an indication of an intended BA type, in accordance with certain aspects of the present disclosure. For example, while values of the Block Ack Action field from 3-255 may be reserved, one or more of these reserved values may be used to indicate an intended BA type (e.g., 4 for an NDP BA Request). In another embodiment the indication may use one reserved bit of the Block Ack Action field. For example the first most significant bit of the Block Ack Action field may be used by the originator to indicate the use of NDP BlockAck frames.

As another example, a Dialog Token field may be used for a specific (or random selection) indication. For example, 1 bit of a Dialog Token may be used to indicate a frame type (e.g. first LSB of Dialog token may be 0 if Normal BA is requested or 1 for NDP BA).

Also, a Block Ack Starting Sequence Control may be used to indicate a frame type. While a Fragment number is typically set to 0, a different (non-zero) value of a fragment number may be used to indicate a frame type. In some cases, rather than or in addition to the fields described above, a new Information Element may be used. For example, an NDP Block Ack Element may indicate that the originator requires (or prefers) to receive NDP BlockAck frames during the agreed Block Ack session.

According to certain aspects, a recipient may provide an indication of an intended BA type in a response to a session request. For example, the response may include an indication of intention to use Normal BA or NDP BA frames via one or more values in a Block Ack Action field.

FIG. 8 illustrates an example ADDBA Response Action field format that may be used to provide an indication of an intended BA type, in a similar manner as described above with reference to the ADDBA Request Action field format of FIG. 7. For example, while values from 3-255 of the Block Ack Action field may be reserved, one or more of these reserved values may be used to indicate an intended BA type (e.g., 4 for an NDP BA Request). In another embodiment, the indication may use one reserved bit of the Block Ack Action field. For example the first most significant bit of the Block Ack Action field may be used by the recipient to indicate the use of NDP BlockAck frames.

As another example, a Dialog Token field may be used for a specific (or random selection) indication. For example, 1 bit of a Dialog Token may be used to indicate a frame type (e.g. first LSB of Dialog Token may be i0 if Normal BA or 1 if NDP BA may be sent by the recipient).

In some cases, rather than or in addition to the fields shown in FIGS. 7 and 8, a new Information Element may be used. For example, an NDP Block Ack Element may indicate that the recipient may send NDP BlockAck frames during the agreed Block Ack session.

In general, any current (or previously) reserved value of any field may be used to indicate frame type (e.g., the value will be used as an indication rather than reserved). Further, combinations of values for different fields may also be used as an indication.

In some cases, an indication may be provided in a Capability Information element. For example, a new subfield may be included to indicate NDP BlockAck capability. In some cases, this indication may be provided by a combination of existing subfields that might not otherwise make sense. For example, an indication may be provided by setting both an Immediate Block Ack and a Delayed Block Ack set to 1 to indicate NDP BlockAcks.

In some cases, there may be implicit indications of a BA type. For example, on the recipient side, a switch from Normal BA to NDP BA may be implementation specific based on one or more rules or conditions. As an example, if number of MPDUs to be ACK'd is less than or equal to bitmap size of NDP BlockAck the recipient may use always NDP BA frames. As another example, if Buffersize of recipient is less than or equal to bitmap size of NDP BlockAck always use NDP BA frames.

On the originator side, a BAR requesting NDP BAs may be sent. In some cases, there may be used reserved bits in the BAR to indicate such a request. Examples of such reserved bits include, but are not limited to, a Retry bit, more fragments bits. Reserved fields in BAR control field, fragment number subfield in Starting Sequence control field, etc can be used for this indication. An originator may also send an A-MPDU requesting NDP BAs. In this case, reserved bits in the A-MPDU header may be used to indicate such request. Examples of these reserved bits include, but are not limited to, More fragments bits in frame control field, and fragment number in sequence control field.

According to certain aspects, in an A-MPDU, the MPDU with the highest sequence number (SN) may be sent as the first packet of the A-MPDU. The MPDU with highest SN is the one that determines WinStartO according to current specifications. WinStartO generally refers to an unsigned integer that represents a lowest sequence number position in a bitmap indexed by the sequence number.

According to certain aspects, the originator of an A-MPDU may include a BAR frame as the first frame of the A-MPDU with SSN of the BAR set to WinStartO. According to certain aspects, generation, receipt, and recording of block acknowledgements may be as described in the attached APPENDIX.

According to certain aspects, the originator of an (A-) MPDU may include an indication to calculate WinStartO in each MPDU. In one embodiment these MPDUs can be aggregated in an A-MPDU. In one aspect, the originator may use the Fragment Number of the Sequence Control field of each MPDU of the A-MPDU to indicate the relative distance of the SN of the MPDU to the WinStartO. For example if the originator sends an A-MPDU that has aggregated an MPDU with a Sequence Number that has a value of 6 and WinStartO has a value of 2, the originator may set the value of the Fragment Number to 4. In general the recipient of an MPDU which has a given Sequence Number (SN) and a Fragment number (FN) set according to this aspect can calculate WinStartO=SN−FN. Accordingly, it can obtain WinEndO=WinStartO+WinSizeO−1.

In another aspect, the originator may use the Fragment number of the Sequence Control of each of the MPDUs of the A-MPDU to indicate the relative distance of the SN of the MDPU to WinEndO, which in one aspect can be calculated as WinStartO+WinSizeO−1. For example if the originator sends an A-MPDU that has aggregated an MPDU with a Sequence Number that has a value of 6 and WinEndO has a value of 9 (same as previous example with WinSizeO=8), the originator may set the value of the FN to 3. In general, the recipient of an MPDU which has a given SN and a FN value set according to this aspect, can calculate WinEndO=SN+FN. Accordingly, it can obtain WinStartO=WinEndO−WinSizeO+1.

In some aspects other fields rather than Fragment number can be used to indicate the relative distance of the MPDU to WinEndO or WinStartO. As an example any bit that is currently reserved in an MPDU or MPDU delimiter can be used for this purpose, provided that the number of bits is sufficient to indicate all possible offset values within WinSizeO.

In some aspects it may be necessary to aid the recipient of a given (A-) MPDU in the correct interpretation of the Fragment Number (or other fields used for the same purpose as specified in the aforementioned method). While in certain aspects the indication may be implicit (for example a recipient receiving A-MPDUs under HT-immediate Block-Ack mechanism always knows that FN indicates the relative distance to WinStartO or WinStartR if FN is greater than 0. This is because currently FN is set to 0 for all MPDUs of an A-MPDUs).

In some aspects, a reserved bit may be used to indicate the new functionality of the Fragment Number field. For example, a single reserved bit in any field or subfield of an (A-) MPDU can be used for this purpose. In one embodiment the one reserved bit in the MPDU delimiter field which separates different MPDUs in an A-MPDU can be used to indicate this new functionality. In other embodiments, the more fragment bit (or some other reserved bit in the frame control of the MPDU) can be used to indicate this new functionality. Another example is the utilization of the $15^{th}$ bit of the duration field which is currently reserved for data frames.

In some embodiments the combination of existing bits in the MAC header of an MPDU can be used to indicate this new functionality. As an example, a combination of more fragment bit set to 1 and EOSP bit set to 1 may indicate this functionality.

In one embodiment, this per-MPDU indication of WinStartO (or equivalently WinEndO) at the recipient can be used to design failure recovery methods for NDP Block Ack mechanisms in those cases where the Originator receives an NDP BlockAck which is not generated by its intended receiver but has the same BlockAck ID as the one it is expecting for. This event, along with the event of the CRC not being able to detect errors in the NDP BlockAck, may lead to false acknowledgement cases.

More precisely, a false acknowledgement event may happen when the Recipient which generates the NDP BlockAck indicates in its bitmap that an MPDU with a given SN is not received, but for some reason (e.g., there is an error in the received bitmap at the Originator, or a false BlockAck event happened) the Originator receives an indication that the MPDU with that SN is correctly received. In this case the Originator, may advance its WinStartO as its BlockAck score indicates that everything before WinStartO is correctly received. As such, the MPDU with SN is reported as correctly delivered when it is not. In one embodiment, the Recipient may detect this problem by comparing the calculated WinStartO based on the SN and FN of the received MPDU. If the calculated WinStartO is greater than the Recipient NextExpectedSequenceNumber (which may be indicated by a variable WinStartB) then it may report to the Originator that something went wrong during the previous BlockAck exchange.

In one embodiment the indication can be the transmission of an NDP BA frame with starting Sequence number=to WinStartO but with all bits in the bitmap set to 0. In another embodiment the indication can be an additional bit in the NDP BA frame which plays the role of failure indication bit. When the originator receives an NDP BA frame that has this indication it may send a BAR with a Starting Sequence Number=WinStartO−WinSizeO+1 to solicit an NDP BlockAck response frame by the Recipient with the current status of the Window where the failure may have happened. By checking its previous window record (WinStartO−WinSizeO+1 to WinStartO) and the received BA frame bitmap, the originator may detect the false acknowledged packet(s) and retransmit them again. The originator may continue to keep the MPDUs with SN within the previous window record, in order to be able to retransmit them in case of these events. Once the failed MPDU is successfully retransmitted the Originator and Recipient can continue transmitting MPDUs that fall within the current transmission window (WinStartO, WinStartO+WinSizeO−1).

According to certain aspects, the originator can include a BlockAckReq frame in an A-MPDU that solicits an immediate BlockAck response to help in synchronizing the recipient's window with the originator's transmission window when NDP BlockAck frames are used.

Figure 5A:
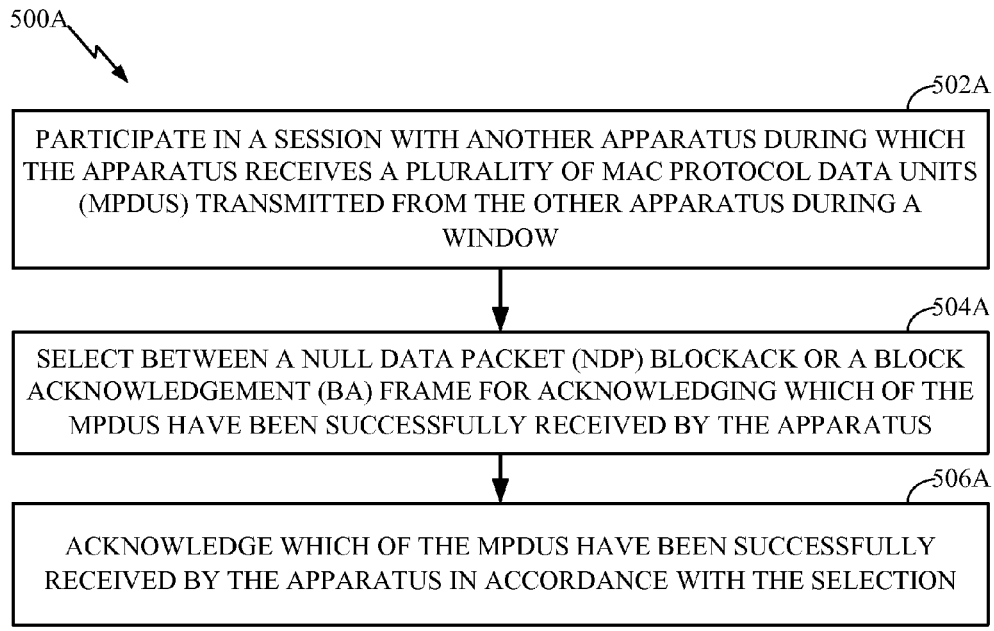
FIG. 5A illustrates example means capable of performing the operations shown in FIG. 5.
Figure 6A:
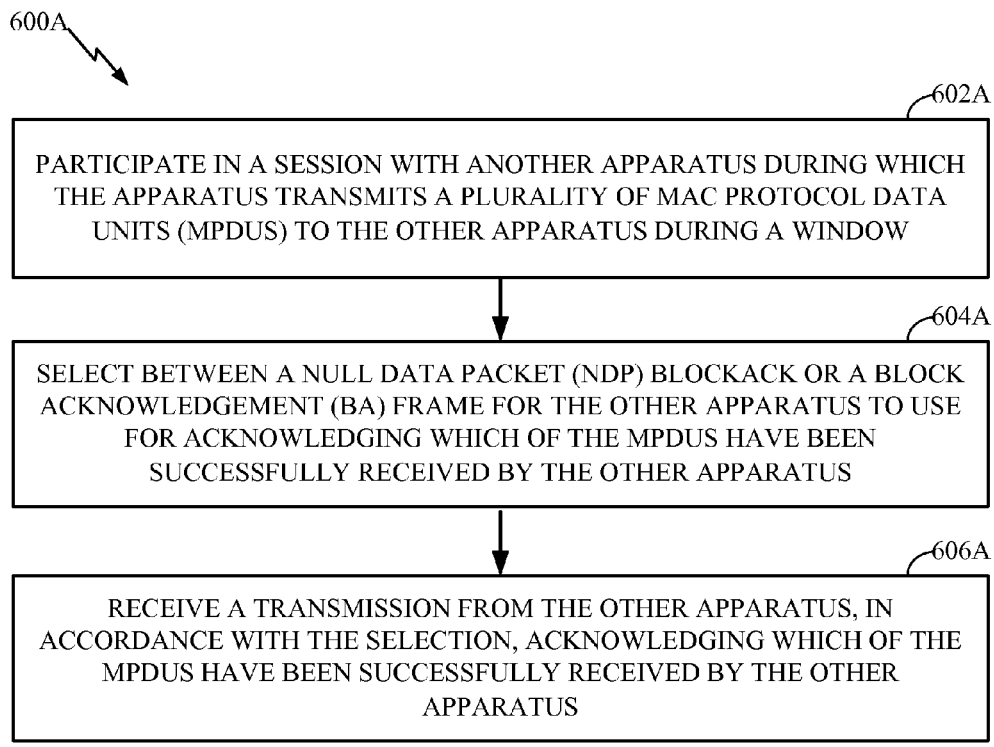
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for participating, means for selecting, means for acknowledging, and means for determining may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art.

Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to participate in a session with another apparatus during which the apparatus receives a plurality of MAC protocol data units (MPDUs) transmitted from the other apparatus during a window and select between a first block acknowledgement of a first type or a second block acknowledgement of a second type different from the first type for acknowledging which of the MPDUs have been successfully received by the apparatus based, at least in part, on whether a bitmap available in the first block acknowledgement is sufficient to acknowledge all of the MPDUs transmitted in the window; and
a transmitter configured to acknowledge which of the MPDUs have been successfully received by the apparatus in accordance with the selection.

2. The apparatus of claim 1, wherein the processing system is configured to:
select the first block acknowledgement for acknowledging the MPDUs if the bitmap available in the first block acknowledgement is sufficient to acknowledge all of the MPDUs transmitted in the window.

3. The apparatus of claim 1, wherein the processing system is configured to:
select the second block acknowledgement for acknowledging the MPDUs if the bitmap available in the first block acknowledgement is insufficient to acknowledge all of the MPDUs transmitted in the window.

4. The apparatus of claim 1, further comprising a receiver configured to receive an indication, from the other apparatus, requesting the apparatus to use either the first block acknowledgement or the second block acknowledgement.

5. The apparatus of claim 4, wherein the processing system is configured to:
select either the first block acknowledgement or the second block acknowledgement for acknowledging the MPDUs further based on the indication.

6. The apparatus of claim 4, wherein the processing system is configured to:
select either the first block acknowledgement or the second block acknowledgement for acknowledging the MPDUs, independently of the indication.

7. The apparatus of claim 1, further comprising a receiver configured to receive, from the other apparatus, a session request frame having a BlockAck Action field, wherein the processing system is configured to:
select the first block acknowledgement for acknowledging the MPDUs if a first value of the BlockAck Action Field indicates a request for the apparatus to use the first block acknowledgement for acknowledging the MPDUs or select a second block acknowledgement for acknowledging the MPDUs if a second value of the BlockAck Action Field indicates a request for the apparatus to use the second block acknowledgement for acknowledging the MPDUs.

8. The apparatus of claim 1, wherein the transmitter is configured to provide an indication that the apparatus intends to use either the first block acknowledgement or the second block acknowledgement for acknowledgement.

9. The apparatus of claim 8, wherein the indication is provided via a response to a session request frame.

10. The apparatus of claim 9, wherein the indication is provided via a value of a Status Code of the response to the session request frame.

11. The apparatus of claim 9, wherein the indication is provided via a value of the Dialog token of the response to the session request frame.

12. The apparatus of claim 9, wherein the indication is provided via an information element (IE) transmitted with the response to the session request response frame.

13. The apparatus of claim 1, wherein:
the reception of the plurality of MPDUs comprises receiving an aggregated MPDU (A-MPDU) comprising the plurality of MPDUs; and
the MPDU having a highest sequence number (SN) is a first packet in the A-MPDU.

14. The apparatus of claim 13, wherein:
the processing system is further configured to calculate, based at least in part on the SN of the MPDU having the highest SN, a parameter indicating a start of the window.

15. The apparatus of claim 1, wherein:
the reception of the plurality of MPDUs comprises receiving an aggregated MPDU (A-MPDU) comprising the plurality of MPDUs; and
a block acknowledgement request (BAR) frame is a first packet in the A-MPDU.

16. The apparatus of claim 15, wherein:
the processing system is further configured to calculate, based at least in part on a sequence number (SN) of the BAR, a parameter indicating a start of the window.

17. The apparatus of claim 1, wherein:
the reception of the plurality of MPDUs comprises receiving an aggregated MPDU (A-MPDU) comprising the plurality of MPDUs and a block acknowledgement request (BAR) frame.

18. The apparatus of claim 17, wherein:
the BAR frame solicits an immediate BlockAck response; and
the first block acknowledgement comprises an immediate BlockAck.

19. The apparatus of claim 1, wherein:
the reception of the plurality of MPDUs comprises receiving an aggregated MPDU (A-MPDU) comprising the plurality of MPDUs;
each of the plurality of MPDUs comprises a sequence number (SN) and an indication of a value allowing the apparatus to calculate a start window parameter representing a lowest sequence number position in a bitmap indexed by the SN; and
the processing system is further configured to calculate the start window parameter based, at least in part, on the SN and the indicated value.

20. The apparatus of claim 19, wherein the indicated value indicates a relative distance from at least one of the start window parameter or an end window parameter representing a highest sequence number position in the bitmap indexed by the SN.

21. The apparatus of claim 19, wherein the indication is received as a fragment number of a sequence control field of each MPDU.

22. The apparatus of claim 21, wherein the processing system is further configured to determine, based on one or more bits in each MPDU, whether or not the fragment number is used to provide the indication.

23. The apparatus of claim 22, wherein the one or more bits comprise a combination of MAC header bits that indicate whether or not the fragment number is used to provide the indication.

24. The apparatus of claim 22, wherein the one or more bits comprise at least one of: a bit in an MPDU delimiter field, a More Fragment bit, or a bit in a duration field.

25. The apparatus of claim 19, wherein:
the processing system is further configured to detect if a failure has occurred by comparing the calculated start window parameter to a parameter indicating a next expected sequence number.

26. The apparatus of claim 1, wherein the first block acknowledgement comprises a null data packet (NDP) block acknowledgement and the second block acknowledgement comprises a block acknowledgement (BA) frame.

27. An apparatus for wireless communications, comprising:
a processing system configured to participate in a session with another apparatus during which the apparatus transmits a plurality of MAC protocol data units (MPDUs) to the other apparatus during a window and select between a first block acknowledgement of a first type or a second block acknowledgement of a second type different from the first type for the other apparatus to use for acknowledging which of the MPDUs have been successfully received by the other apparatus based, at least in part, on whether a bitmap available in the first block acknowledgement is sufficient to acknowledge all of the MPDUs transmitted in the window; and
a receiver configured to receive a transmission from the other apparatus acknowledging which of the MPDUs have been successfully received by the other apparatus.

28. The apparatus of claim 27, wherein the processing system is configured to:
select the first block acknowledgement for acknowledging the MPDUs if the bitmap available in the first block acknowledgement is sufficient to acknowledge all of the MPDUs transmitted in the window.

29. The apparatus of claim 27, wherein the processing system is configured to:
select the second block acknowledgement for acknowledging the MPDUs if the bitmap available in the first block acknowledgement is insufficient to acknowledge all of the MPDUs transmitted in the window.

30. The apparatus of claim 27, further comprising a transmitter configured to transmit an indication, to the other apparatus, requesting the other apparatus to use either the first block acknowledgement or the second block acknowledgement.

31. The apparatus of claim 30, wherein the indication is transmitted via a session request frame.

32. The apparatus of claim 31, wherein the indication is transmitted via a value of a fragment number field of the session request frame.

33. The apparatus of claim 31, wherein the indication is transmitted via at least one value of a Block ACK Action Field of the session request frame.

34. The apparatus of claim 33, wherein:
a first value of the BlockAck Action Field indicates a request for the other apparatus to use the first block acknowledgement for acknowledging the MPDUs; and
a second value of the BlockAck Action Field indicates a request for the other apparatus to use the second block acknowledgement for acknowledging the MPDUs.

35. The apparatus of claim 31, wherein the indication is provided via a single bit of a BlockAck Action Field of the session request frame.

36. The apparatus of claim 31, wherein the indication is transmitted via an information element (IE) transmitted with the session request frame.

37. The apparatus of claim 30, wherein the indication is transmitted in at least one of a block acknowledgement request (BAR), an A-MPDU or MPDU.

38. The apparatus of claim 27, wherein the receiver is further configured to receive an indication that the other apparatus intends to use either the first block acknowledgement or the second block acknowledgement for acknowledgement, and wherein the selection is further based on the indication.

39. The apparatus of claim 27, wherein:
the transmission of the plurality of MPDUs comprises transmitting an aggregated MPDU (A-MPDU) comprising the plurality of MPDUs; and
the MPDU having a highest sequence number (SN) is a first packet in the A-MPDU.

40. The apparatus of claim 39, wherein the SN of the MPDU having the highest SN defines a parameter indicating a start of the window.

41. The apparatus of claim 27, wherein:
the transmission of the plurality of MPDUs comprises transmitting an aggregated MPDU (A-MPDU) comprising the plurality of MPDUs; and
a block acknowledgement request (BAR) frame is a first packet in the A-MPDU.

42. The apparatus of 41, wherein a sequence number (SN) of the BAR is set to a value of a parameter indicating a start of the window.

43. The apparatus of claim 27, wherein:
the transmission of the plurality of MPDUs comprises transmitting an aggregated MPDU (A-MPDU) comprising the plurality of MPDUs and a block acknowledgement request (BAR) frame.

44. The apparatus of claim 43, wherein:
the BAR frame solicits an immediate BlockAck response; and
receiving the transmission from the other apparatus comprises receiving an immediate BlockAck response.

45. The apparatus of claim 27, wherein:
the transmission of the plurality of MPDUs comprises transmitting an aggregated MPDU (A-MPDU) comprising the plurality of MPDUs; and
each of the plurality of MPDUs in the A-MPDU comprises a sequence number (SN) and an indication of a value allowing the other apparatus to calculate a start window parameter representing a lowest sequence number position in a bitmap indexed by the SN.

46. The apparatus of claim 45, wherein the indication comprises a value indicating a relative distance from at least one of the start window parameter or an end window parameter representing a highest sequence number position in the bitmap indexed by the SN.

47. The apparatus of claim 45, wherein the indication is transmitted as a fragment number of a sequence control field of each MPDU.

48. The apparatus of claim 47, wherein each MPDU comprises one or more bits indicating whether or not the fragment number is used to provide the indication.

49. The apparatus of claim 48, wherein the one or more bits comprise a combination of MAC header bits that indicate whether or not the fragment number is used to provide the indication.

50. The apparatus of claim 27, wherein the first block acknowledgement comprises a null data packet (NDP) block acknowledgement and the second block acknowledgement comprises a block acknowledgement (BA) frame.

51. A method for wireless communications by an apparatus, comprising:
participating in a session with another apparatus during which the apparatus receives a plurality of MAC protocol data units (MPDUs) transmitted from the other apparatus during a window;
selecting between a first block acknowledgement of a first type or a second block acknowledgement of a second type different from the first type for acknowledging which of the MPDUs have been successfully received by the apparatus based, at least in part, on whether a bitmap available in the first block acknowledgement is sufficient to acknowledge all of the MPDUs transmitted in the window; and
acknowledging which of the MPDUs have been successfully received by the apparatus in accordance with the selection.

52. The method of claim 51, wherein the selecting comprises:
selecting the first block acknowledgement for acknowledging the MPDUs if the bitmap available in the first block acknowledgement is sufficient to acknowledge all of the MPDUs transmitted in the window.

53. The method of claim 51, wherein the selecting comprises:
selecting the second block acknowledgement for acknowledging the MPDUs if the bitmap available in the first block acknowledgement is insufficient to acknowledge all of the MPDUs transmitted in the window.

54. The method of claim 51, further comprising receiving an indication, from the other apparatus, requesting the apparatus to use either the first block acknowledgement or the second block acknowledgement.

55. The method of claim 54, wherein the selecting comprises:
selecting either the first block acknowledgement or second block acknowledgement for acknowledging the MPDUs further based on the indication.

56. The method of claim 54, wherein the selecting comprises:
selecting either the first block acknowledgement or the second block acknowledgement for acknowledging the MPDUs, independently of the indication.

57. The method of claim 51, further comprising:
receiving, from the other apparatus, a session request frame having a BlockAck Action field; and
selecting the first block acknowledgement for acknowledging the MPDUs if a first value of the BlockAck Action Field indicates a request for the apparatus to use the first block acknowledgement for acknowledging the MPDUs or select the second block acknowledgement for acknowledging the MPDUs if a second value of the BlockAck Action Field indicates a request for the apparatus to use the second block acknowledgement for acknowledging the MPDUs.

58. The method of claim 51, further comprising providing an indication that the apparatus intends to use either the first block acknowledgement or the second block acknowledgement for acknowledgement.

59. The method of claim 58, wherein the indication is provided via a response to a session request frame.

60. The method of claim 59, wherein the indication is provided via a value of a Status Code of the response to the session request frame.

61. The method of claim 59, wherein the indication is provided via a value of the Dialog token of the response to the session request frame.

62. The method of claim 59, wherein the indication is provided via an information element (IE) transmitted with the response to the session request response frame.

63. The method of claim 51, wherein:
the reception of the plurality of MPDUs comprises receiving an aggregated MPDU (A-MPDU) comprising the plurality of MPDUs; and
the MPDU having a highest sequence number (SN) is a first packet in the A-MPDU.

64. The method of claim 63, further comprising:
calculating, based at least in part on the SN of the MPDU having the highest SN, a parameter indicating a start of the window.

65. The method of claim 51, wherein:
the reception of the plurality of MPDUs comprises receiving an aggregated MPDU (A-MPDU) comprising the plurality of MPDUs; and
a block acknowledgement request (BAR) frame is a first packet in the A-MPDU.

66. The method of 65, further comprising:
calculating, based at least in part on a sequence number (SN) of the BAR, a parameter indicating a start of the window.

67. The method of claim 51, wherein:
the reception of the plurality of MPDUs comprises receiving an aggregated MPDU (A-MPDU) comprising the plurality of MPDUs and a block acknowledgement request (BAR) frame.

68. The method of claim 67, wherein:
the BAR frame solicits an immediate BlockAck response if first block acknowledgement frames are selected; and
the first block acknowledgement comprises an immediate BlockAck response.

69. The method of claim 51, wherein:
the reception of the plurality of MPDUs comprises receiving an aggregated MPDU (A-MPDU) comprising the plurality of MPDUs; and
each of the plurality of MPDUs comprises a sequence number (SN) and an indication of a value allowing the apparatus to calculate a start window parameter representing a lowest sequence number position in a bitmap indexed by the SN, further comprising:
calculating the start window parameter based, at least in part, on the SN and the indicated value.

70. The method of claim 69, wherein the indicated value indicates a relative distance from at least one of the start window parameter or an end window parameter representing a highest sequence number position in the bitmap indexed by the SN.

71. The method of claim 69, wherein the indication is received as a fragment number of a sequence control field of each MPDU.

72. The method of claim 71, further comprising determining, based on one or more bits in each MPDU, whether or not the fragment number is used to provide the indication.

73. The method of claim 72, wherein the one or more bits comprise a combination of MAC header bits that indicate whether or not the fragment number is used to provide the indication.

74. The method of claim 72, wherein the one or more bits comprise at least one of: a bit in an MPDU delimiter field, a More Fragment bit, or a bit in a duration field.

75. The method of claim 69, wherein:
the processing system is further configured to detect if a failure has occurred by comparing the calculated start window parameter to a parameter indicating a next expected sequence number.

76. A method for wireless communications by an apparatus, comprising:
participating in a session with another apparatus during which the apparatus transmits a plurality of MAC protocol data units (MPDUs) to the other apparatus during a window; and
selecting between a first block acknowledgement of a first type or a second block acknowledgement of a second type different from the first type for the other apparatus to use for acknowledging which of the MPDUs have been successfully received by the other apparatus based, at least in part, on whether a bitmap available in the first block acknowledgement is sufficient to acknowledge all of the MPDUs transmitted in the window; and
receiving a transmission from the other apparatus acknowledging which of the MPDUs have been successfully received by the other apparatus.

77. The method of claim 76, wherein the selecting comprises:
selecting the first block acknowledgement for acknowledging the MPDUs if the bitmap available in the first block acknowledgement is sufficient to acknowledge all of the MPDUs transmitted in the window.

78. The method of claim 76, wherein the selecting comprises:
selecting the second block acknowledgement for acknowledging the MPDUs if the bitmap available in the first block acknowledgement is insufficient to acknowledge all of the MPDUs transmitted in the window.

79. The method of claim 76, further comprising transmitting an indication, to the other apparatus, requesting the other apparatus to use either the first block acknowledgement or the second block acknowledgement.

80. The method of claim 79, wherein the indication is transmitted via a session request frame.

81. The method of claim 80, wherein the indication is transmitted via a value of a fragment number field of the session request frame.

82. The method of claim 80, wherein the indication is transmitted via at least one value of a Block ACK Action Field of the session request frame.

83. The method of claim 82, wherein:
a first value of the BlockAck Action Field indicates a request for the other apparatus to use the first block acknowledgement for acknowledging the MPDUs; and
a second value of the BlockAck Action Field indicates a request for the other apparatus to use the second block acknowledgement for acknowledging the MPDUs.

84. The method of claim 80, wherein the indication is provided via a single bit of a BlockAck Action Field of the session request frame.

85. The method of claim 80, wherein the indication is transmitted via an information element (IE) transmitted with the session request frame.

86. The method of claim 79, wherein the indication is transmitted in at least one of a block acknowledgement request (BAR), an A-MPDU or MPDU.

87. The method of claim 76, further comprising receiving an indication that the other apparatus intends to use either the first block acknowledgement or the second block acknowledgement for acknowledgement, wherein the selection is further based on the indication.

88. The method of claim 76, wherein:
the transmission of the plurality of MPDUs comprises transmitting an aggregated MPDU (A-MPDU) comprising the plurality of MPDUs; and
the MPDU having a highest sequence number (SN) is a first packet in the A-MPDU.

89. The method of claim 88, wherein the SN of the MPDU having the highest SN defines a parameter indicating a start of the window.

90. The method of claim 76, wherein:
the transmission of the plurality of MPDUs comprises transmitting an aggregated MPDU (A-MPDU) comprising the plurality of MPDUs; and
a block acknowledgement request (BAR) frame is a first packet in the A-MPDU.

91. The method of 90, wherein a sequence number (SN) of the BAR is set to a value of a parameter indicating a start of the window.

92. The method of claim 76, wherein:
the transmission of the plurality of MPDUs comprises transmitting an aggregated MPDU (A-MPDU) comprising the plurality of MPDUs and a block acknowledgement request (BAR) frame.

93. The method of claim 92, wherein:
the BAR frame solicits an immediate BlockAck response; and
receiving the transmission from the other apparatus comprises receiving an immediate BlockACK response.

94. The method of claim 76, wherein:
the transmission of the plurality of MPDUs comprises transmitting an aggregated MPDU (A-MPDU) comprising the plurality of MPDUs; and
each of the plurality of MPDUs in the A-MPDU comprises a sequence number (SN) and an indication of a value allowing the other apparatus to calculate a start window parameter representing a lowest sequence number position in a bitmap indexed by the SN.

95. The method of claim 94, wherein the indication comprises a value indicating a relative distance from at least one of the start window parameter or an end window parameter representing a highest sequence number position in the bitmap indexed by the SN.

96. The method of claim 94, wherein the indication is transmitted as a fragment number of a sequence control field of each MPDU.

97. The method of claim 96, wherein each MPDU comprises one or more bits indicating whether or not the fragment number is used to provide the indication.

98. The method of claim 97, wherein the one or more bits comprise a combination of MAC header bits that indicate whether or not the fragment number is used to provide the indication.

99. An apparatus for wireless communications, comprising:
means for participating in a session with another apparatus during which the apparatus receives a plurality of MAC protocol data units (MPDUs) transmitted from the other apparatus during a window;
means for selecting between a first block acknowledgement of a first type or a second block acknowledgement of a second type different from the first type for acknowledging which of the MPDUs have been successfully received by the apparatus based, at least in part, on whether a bitmap available in the first block acknowledgement is sufficient to acknowledge all of the MPDUs transmitted in the window; and
means for acknowledging which of the MPDUs have been successfully received by the apparatus in accordance with the selection.

100. The apparatus of claim 99, wherein the means for selecting comprises:
means for selecting the first block acknowledgement for acknowledging the MPDUs if the bitmap available in the first block acknowledgement is sufficient to acknowledge all of the MPDUs transmitted in the window.

101. The apparatus of claim 99, wherein the means for selecting comprises:
means for selecting the second block acknowledgement for acknowledging the MPDUs if the bitmap available in the first block acknowledgement is insufficient to acknowledge all of the MPDUs transmitted in the window.

102. The apparatus of claim 99, further comprising means for receiving an indication, from the other apparatus, requesting the apparatus to use either the first block acknowledgement or the second block acknowledgement.

103. The apparatus of claim 102, wherein the means for selecting comprises:
means for selecting either the first block acknowledgement or the second block acknowledgement for acknowledging the MPDUs further based on the indication.

104. The apparatus of claim 102, wherein the means for selecting comprises:
means for selecting either the first block acknowledgement or the second block acknowledgement for acknowledging the MPDUs, independently of the indication.

105. The apparatus of claim 99, further comprising:
means for receiving, from the other apparatus, a session request frame having a BlockAck Action field; and
means for selecting the first block acknowledgement for acknowledging the MPDUs if a first value of the BlockAck Action Field indicates a request for the apparatus to use the first block acknowledgement for acknowledging the MPDUs or select the second block acknowledgement for acknowledging the MPDUs if a second value of the BlockAck Action Field indicates a request for the apparatus to use the second block acknowledgement for acknowledging the MPDUs.

106. The apparatus of claim 99, further comprising means for providing an indication that the apparatus intends to use either the first block acknowledgement or the second block acknowledgement for acknowledgement.

107. The apparatus of claim 106, wherein the indication is provided via a response to a session request frame.

108. The apparatus of claim 107, wherein the indication is provided via a value of a Status Code of the response to the session request frame.

109. The apparatus of claim 107, wherein the indication is provided via a value of the Dialog token of the response to the session request frame.

110. The apparatus of claim 107, wherein the indication is provided via an information element (IE) transmitted with the response to a session request response frame.

111. The apparatus of claim 99, wherein:
the reception of the plurality of MPDUs comprises receiving an aggregated MPDU (A-MPDU) comprising the plurality of MPDUs; and
the MPDU having a highest sequence number (SN) is a first packet in the A-MPDU.

112. The apparatus of claim 111, further comprising:
means for calculating, based at least in part on the SN of the MPDU having the highest SN, a parameter indicating a start of the window.

113. The apparatus of claim 99, wherein:
the reception of the plurality of MPDUs comprises receiving an aggregated MPDU (A-MPDU) comprising the plurality of MPDUs; and
a block acknowledgement request (BAR) frame is a first packet in the A-MPDU.

114. The apparatus of 113, further comprising:
means for calculating, based at least in part on a sequence number (SN) of the BAR, a parameter indicating a start of the window.

115. The apparatus of claim 99, wherein:
the reception of the plurality of MPDUs comprises receiving an aggregated MPDU (A-MPDU) comprising the plurality of MPDUs and a block acknowledgement request (BAR) frame.

116. The apparatus of claim 115, wherein:
the BAR frame solicits an immediate BlockAck response; and the first block acknowledgement comprises an immediate BlockAck response.

117. The apparatus of claim 99, wherein:
the reception of the plurality of MPDUs comprises receiving an aggregated MPDU (A-MPDU) comprising the plurality of MPDUs; and
each of the plurality of MPDUs comprises a sequence number (SN) and an indication of a value allowing the apparatus to calculate a start window parameter representing a lowest sequence number position in a bitmap indexed by the SN, further comprising:
means for calculating the start window parameter based, at least in part, on the SN and the indicated value.

118. The apparatus of claim 117, wherein the indicated value indicates a relative distance from at least one of the start window parameter or an end window parameter representing a highest sequence number position in the bitmap indexed by the SN.

119. The apparatus of claim 117, wherein the indication is received as a fragment number of a sequence control field of each MPDU.

120. The apparatus of claim 119, wherein the apparatus comprises means for determining, based on one or more bits in each MPDU, whether or not the fragment number is used to provide the indication.

121. The apparatus of claim 120, wherein the one or more bits comprise a combination of MAC header bits that indicate whether or not the fragment number is used to provide the indication.

122. The apparatus of claim 120, wherein the one or more bits comprise at least one of: a bit in an MPDU delimiter field, a More Fragment bit, or a bit in a duration field.

123. The apparatus of claim 117, further comprising:
means for detecting if a failure has occurred by comparing the calculated start window parameter to a parameter indicating a next expected sequence number.

124. An apparatus for wireless communications, comprising:
means for participating in a session with another apparatus during which the apparatus transmits a plurality of MAC protocol data units (MPDUs) to the other apparatus during a window; and
means for selecting between a first block acknowledgement of a first type or a second block acknowledgement of a second type different from the first type for the other apparatus to use for acknowledging which of the MPDUs have been successfully received by the other apparatus based, at least in part, on whether a bitmap available in the first block acknowledgement is sufficient to acknowledge all of the MPDUs transmitted in the window; and
means for receiving a transmission from the other apparatus acknowledging which of the MPDUs have been successfully received by the other apparatus.

125. The apparatus of claim 124, wherein the means for selecting comprises:
means for selecting the first block acknowledgement for acknowledging the MPDUs if the bitmap available in the first block acknowledgement is sufficient to acknowledge all of the MPDUs transmitted in the window.

126. The apparatus of claim 124, wherein the means for selecting comprises:
means for selecting the second block acknowledgement for acknowledging the MPDUs if the bitmap available in the first block acknowledgement is insufficient to acknowledge all of the MPDUs transmitted in the window.

127. The apparatus of claim 124, further comprising means for transmitting an indication, to the other apparatus, requesting the other apparatus to use either the first block acknowledgement or the second block acknowledgement.

128. The apparatus of claim 127, wherein the indication is transmitted via a session request frame.

129. The apparatus of claim 128, wherein the indication is transmitted via a value of a fragment number field of the session request frame.

130. The apparatus of claim 128, wherein the indication is transmitted via at least one value of a Block ACK Action Field of the session request frame.

131. The apparatus of claim 130, wherein:
a first value of the BlockAck Action Field indicates a request for the other apparatus to use the first block acknowledgement for acknowledging the MPDUs; and
a second value of the BlockAck Action Field indicates a request for the other apparatus to use the second block acknowledgement for acknowledging the MPDUs.

132. The apparatus of claim 128, wherein the indication is provided via a single bit of a BlockAck Action Field of the session request frame.

133. The apparatus of claim 128, wherein the indication is transmitted via an information element (IE) transmitted with the session request frame.

134. The apparatus of claim 127, wherein the indication is transmitted in at least one of a block acknowledgement request (BAR), an A-MPDU or MPDU.

135. The apparatus of claim 124, wherein:
the means for receiving is further configured to receive an indication that the other apparatus intends to use either the first block acknowledgement or the second block acknowledgement for acknowledgement, and the selection is further based on the indication.

136. The apparatus of claim 124, wherein:
the transmission of the plurality of MPDUs comprises transmitting an aggregated MPDU (A-MPDU) comprising the plurality of MPDUs; and
the MPDU having a highest sequence number (SN) is a first packet in the A-MPDU.

137. The apparatus of claim 136, wherein the SN of the MPDU having the highest SN defines a parameter indicating a start of the window.

138. The apparatus of claim 124, wherein:
the transmission of the plurality of MPDUs comprises transmitting an aggregated MPDU (A-MPDU) comprising the plurality of MPDUs; and
a block acknowledgement request (BAR) frame is a first packet in the A-MPDU.

139. The apparatus of 138, wherein a sequence number (SN) of the BAR is set to a value of a parameter indicating a start of the window.

140. The apparatus of claim 124, wherein:
the transmission of the plurality of MPDUs comprises transmitting an aggregated MPDU (A-MPDU) comprising the plurality of MPDUs and a block acknowledgement request (BAR).

141. The apparatus of claim 140, wherein:
the BAR frame solicits an immediate BlockAck response; and
means for receiving the transmission from the other apparatus comprises means for receiving an immediate BlockACK response.

142. The apparatus of claim 124, wherein:
- the transmission of the plurality of MPDUs comprises transmitting an aggregated MPDU (A-MPDU) comprising the plurality of MPDUs; and
- each of the plurality of MPDUs in the A-MPDU comprises a sequence number (SN) and an indication of a value allowing the other apparatus to calculate a start window parameter representing a lowest sequence number position in a bitmap indexed by the SN.

143. The apparatus of claim 142, wherein the indication comprises a value indicating a relative distance from at least one of the start window parameter or an end window parameter representing a highest sequence number position in the bitmap indexed by the SN.

144. The apparatus of claim 142, wherein the indication is transmitted as a fragment number of a sequence control field of each MPDU.

145. The apparatus of claim 144, wherein each MPDU comprises one or more bits indicating whether or not the fragment number is used to provide the indication.

146. The apparatus of claim 145, wherein the one or more bits comprise a combination of MAC header bits that indicate whether or not the fragment number is used to provide the indication.

147. A non-transitory computer readable medium having instructions stored thereon, the instructions executable for:
- participating, by an apparatus, in a session with another apparatus during which the apparatus receives a plurality of MAC protocol data units (MPDUs) transmitted from the other apparatus during a window;
- selecting, by the apparatus, between a first block acknowledgement of a first type or a second block acknowledgement of a second type different from the first type for acknowledging which of the MPDUs have been successfully received by the apparatus based, at least in part, on whether a bitmap available in the first block acknowledgement is sufficient to acknowledge all of the MPDUs transmitted in the window; and
- acknowledging, by the apparatus, which of the MPDUs have been successfully received by the apparatus in accordance with the selection.

148. A non-transitory computer readable medium having instructions stored thereon, the instructions executable for:
- participating, by an apparatus, in a session with another apparatus during which the apparatus transmits a plurality of MAC protocol data units (MPDUs) to the other apparatus during a window;
- selecting, by the apparatus, between a first block acknowledgement of a first type or a second block acknowledgement of a second type different from the first type for the other apparatus to use for acknowledging which of the MPDUs have been successfully received by the other apparatus based, at least in part, on whether a bitmap available in the first block acknowledgement is sufficient to acknowledge all of the MPDUs transmitted in the window; and
- receiving, by the apparatus, a transmission from the other apparatus acknowledging which of the MPDUs have been successfully received by the other apparatus.

149. A station, comprising:
- at least one antenna;
- a processing system configured to participate in a session with another station during which the station receives a plurality of MAC protocol data units (MPDUs) transmitted from the other station during a window, and select between a first block acknowledgement of a first type or a second block acknowledgement of a second type different from the first type for acknowledging which of the MPDUs have been successfully received by the station based, at least in part, on whether a bitmap available in the first block acknowledgement is sufficient to acknowledge all of the MPDUs transmitted in the window; and
- a transmitter configured to acknowledge, via the at least one antenna, which of the MPDUs have been successfully received by the station in accordance with the selection.

150. A station, comprising:
- at least one antenna;
- a processing system configured to participate in a session with another station during which the station transmits a plurality of MAC protocol data units (MPDUs) to the other station during a window and select between a first block acknowledgement of a first type or a second block acknowledgement of a second type different from the first type for the other station to use for acknowledging which of the MPDUs have been successfully received by the other station based, at least in part, on whether a bitmap available in the first block acknowledgement is sufficient to acknowledge all of the MPDUs transmitted in the window; and
- a receiver configured to receive, via the at least one antenna, a transmission from the other station acknowledging which of the MPDUs have been successfully received by the other station.

* * * * *